(12) United States Patent
Van Aken et al.

(10) Patent No.: US 6,905,060 B2
(45) Date of Patent: Jun. 14, 2005

(54) METHOD AND SEALANT FOR WELD JOINTS

(75) Inventors: David C. Van Aken, Rolla, MO (US); John A. Baumann, St. Charles, MO (US); Richard J. Lederich, De Peres, MO (US); Rajesh Talwar, Frontenac, MO (US)

(73) Assignees: The Boeing Company, Chicago, IL (US); The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 10/692,825

(22) Filed: Oct. 24, 2003

(65) Prior Publication Data

US 2005/0087582 A1 Apr. 28, 2005

(51) Int. Cl.$^7$ .................. B23K 20/12; B23K 37/00; B23K 28/00
(52) U.S. Cl. .................. 228/112.1; 228/2.1; 228/199
(58) Field of Search .................. 228/112.1, 199, 228/262.5, 2.1

(56) References Cited

U.S. PATENT DOCUMENTS

| | | | |
|---|---|---|---|
| 3,222,630 A | 12/1965 | Gorman | |
| 5,031,822 A * | 7/1991 | Humpston et al. | 228/122.1 |
| 5,298,092 A | 3/1994 | Schriever | |
| 5,308,794 A * | 5/1994 | Tu | 438/652 |
| 5,378,293 A | 1/1995 | Schriever | |
| 5,411,606 A | 5/1995 | Schriever | |
| 5,415,687 A | 5/1995 | Schriever | |
| 5,468,307 A | 11/1995 | Schriever | |
| 5,472,524 A | 12/1995 | Schriever | |
| 5,487,949 A | 1/1996 | Schriever | |
| 5,551,994 A | 9/1996 | Schriever | |
| 5,873,953 A | 2/1999 | Schriever | |
| 6,045,028 A * | 4/2000 | Martin et al. | 228/112.1 |
| 6,177,189 B1 | 1/2001 | Rawlings et al. | |
| 6,248,184 B1 | 6/2001 | Dull et al. | |
| 6,432,225 B1 | 8/2002 | Schriever | |
| 6,497,922 B2 * | 12/2002 | Knight et al. | 427/450 |
| 6,543,670 B2 * | 4/2003 | Mahoney | 228/112.1 |
| 2002/0089828 A1 * | 7/2002 | Suzuki et al. | 361/709 |

* cited by examiner

Primary Examiner—Lynne R. Edmondson
(74) Attorney, Agent, or Firm—Alston & Bird LLP

(57) ABSTRACT

A sealant for a weld joint and an associated weld joint and method are provided. The sealant includes aluminum and germanium and is characterized by a melting temperature that is lower than the melting temperature of the structural member that is joined. The sealant, which is disposed between faying surfaces of the structural members, can fill the spaces between the structural members to prevent the entry of chemicals, moisture, debris, and other substances, thereby reducing the likelihood of corrosion of the joint or structural members at the interface. Further, the sealant can be diffusion bonded to the faying surfaces, for example, by the heat generated during the joining process.

31 Claims, 4 Drawing Sheets

METHOD AND SEALANT FOR WELD JOINTS

BACKGROUND OF THE INVENTION

1. Field of the Invention

The present invention relates to welding of structural members and, more particularly, relates to the sealing of weld joints, for example, to prevent corrosion at the joints.

2. Description of Related Art

The joining of structural members often results in an interface that is susceptible to intrusion by chemicals, moisture, or other fluids and particulates. For example, in the aircraft industry, joints between structural members are often formed by overlapping two or more structural members, forming holes through the members, and disposing rivets or other fasteners through the holes. Although the overlapping members may correspond closely to one another at their interface, each interface nevertheless typically defines a narrow space or crevice-like gap through which moisture, chemicals, debris, and other foreign materials can be received, possibly resulting in increased corrosion of the structural members and the fasteners. Therefore, a sealant such as a caulk-like organic material can be disposed in each interface to seal the interface and prevent the entry of foreign materials therein. The sealant can be disposed before or after the joint is formed, though in some cases the sealant is preferably disposed before joining because the geometrical configuration of the structural members may prevent access to one or both sides of the interface after joining. In some cases, the sealant may be squeezed from the interface during joining, leaving unfilled voids in the interface, which can be difficult to identify and fill, especially if one or both sides of the joint cannot be accessed after joining. Further, even if the sealant does fill the interface, the sealant can dry out and deteriorate or otherwise work free from the joint over time.

Joints can alternatively be formed by welding the structural members. For example, a friction stir weld joint can be formed by overlapping the structural members, rotating a friction stir welding pin extending in a direction generally perpendicular to the interface of the members, and urging the pin through the members along the interface. The pin generates sufficient friction with the structural members to plasticize a portion of the members, and the plasticized material is mixed by the pin. As the plasticized material cools, a friction stir weld joint is formed, characterized by a mixed portion having a refined grain structure, referred to as a nugget. The nugget is typically not as wide as the interface of the overlapping members, and the members therefore define spaces in the interface in which corrosion can occur, similar to the space proximate to the rivet joints described above. A sealant can be disposed in the spaces; however, if the sealant is disposed before welding, care should be taken to avoid introducing the sealant into the nugget of the joint as conventional sealants can negatively impact the strength and/or corrosion resistance of the joint. For example, masking tape can be placed on the area of the structural members where the nugget will be formed, the sealant can be disposed on the structural members, and the masking tape can then be removed to generally leave a clean area for forming the nugget. This process is time consuming. Further, even if such precautions are taken, as the members are placed and urged together to form the joint some of the sealant can be squeezed into the interface and mixed with the plasticized material of the joint, thereby reducing the quality of the weld joint. In addition, as described above, voids can result in the interface during joining or the sealant can be loosened from the interface subsequently.

Thus, there exists a need for an improved sealant and method for forming a corrosion resistant weld joint in a structural member. The sealant and method should be compatible with friction welding and should not be overly time consuming. Further, the sealant should form a strong bond to the structural member without excessively reducing the quality of the weld joint.

BRIEF SUMMARY OF THE INVENTION

The present invention provides a sealant and method for forming a weld joint between structural members. The sealant, which is disposed between faying surfaces of the structural members, includes aluminum and germanium and is characterized by a melting temperature that is lower than the melting temperature of the at least one structural member, and lower than the highest temperature generated during friction stir welding. The sealant can fill the spaces between the structural members to prevent the entry of chemicals, moisture, debris, and other substances, thereby reducing the likelihood of corrosion of the joint or structural members at the interface. Further, the sealant can be diffusion bonded to the faying surfaces, for example, by the heat generated during the joining process, thereby substantially eliminating the risk that the sealant may work free over time.

According to one embodiment of the present invention, the weld joint is formed between first and second faying surfaces of respective structural members in an opposed configuration to define an interface therebetween. The weld joint extends through the interface and connects the first and second faying surfaces. For example, the faying surfaces of the structural members can be substantially parallel, and the weld joint can be substantially perpendicular to the interface of the faying surfaces. The joint can be formed by friction stir welding and can include a nugget area characterized by a refined granular structure. The sealant, which is disposed in and substantially fills the interface, is diffusion bonded to the faying surfaces. In addition to aluminum and germanium, the sealant can include strontium, silver, and silicon. Typically, the sealant includes between about 10% and 51.6% germanium by weight. For example, the sealant can include about 51.6% germanium and about 48.4% aluminum by weight, or the sealant can alternatively include about 30.2% germanium, about 36.8% silver, and about 33% aluminum by weight. The sealant can be characterized by a melting temperature less than about 500° C., for example, about 420° C., and the sealant can be cathodic relative to the at least one structural member.

The present invention also provides a method of sealing a weld joint. The method includes providing at least one structural member and disposing a sealant on at least one of first and second faying surfaces of the structural member. For example, the sealant can be plasma sprayed onto one or both of the faying surfaces and can be disposed in a thickness such as between about 0.001 and 0.003 inches. The sealant includes aluminum and germanium and is characterized by a melting temperature that is lower than the melting temperature of the at least one structural member, as described above. The faying surfaces are positioned in an opposing configuration to form an interface therebetween, and the structural member is welded to form a weld joint extending through the interface. The sealant is heated to melt and/or bond with the at least one structural member proximate to the weld joint to substantially fill the interface. The weld joint can be formed by friction stir welding, e.g., by rotating a friction stir welding pin that extends from a shoulder and urging the pin through the interface. Further, the structural members can be positioned so that the faying surfaces overlap to form the interface with a width about equal to the width of the shoulder.

BRIEF DESCRIPTION OF THE SEVERAL VIEWS OF THE DRAWINGS

Figure 1:
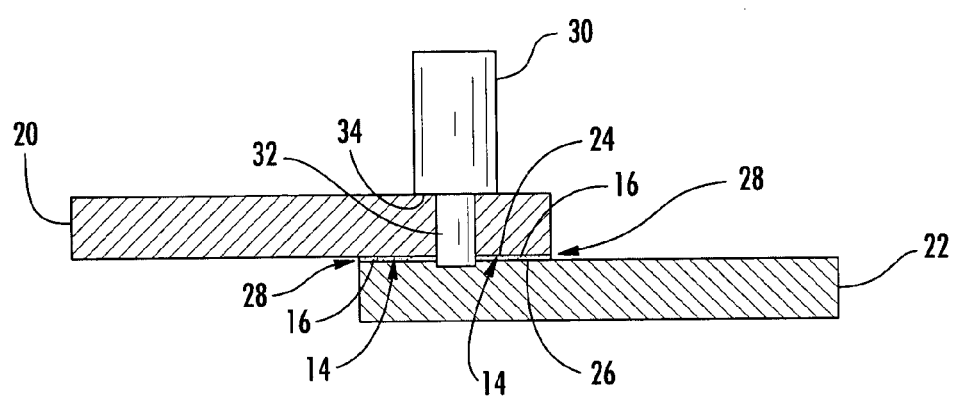
Figure 2:
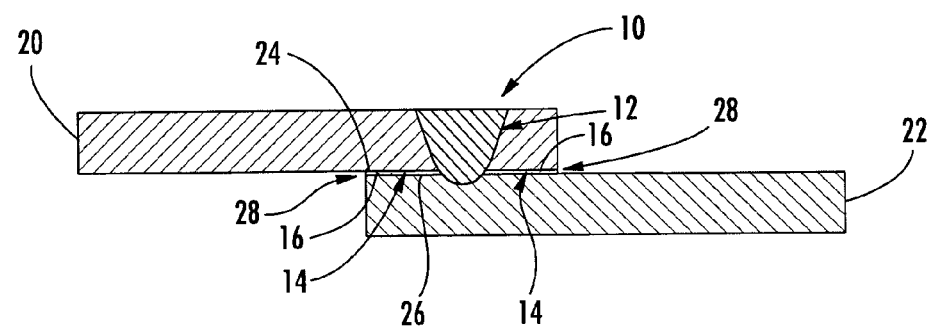
Figure 3:
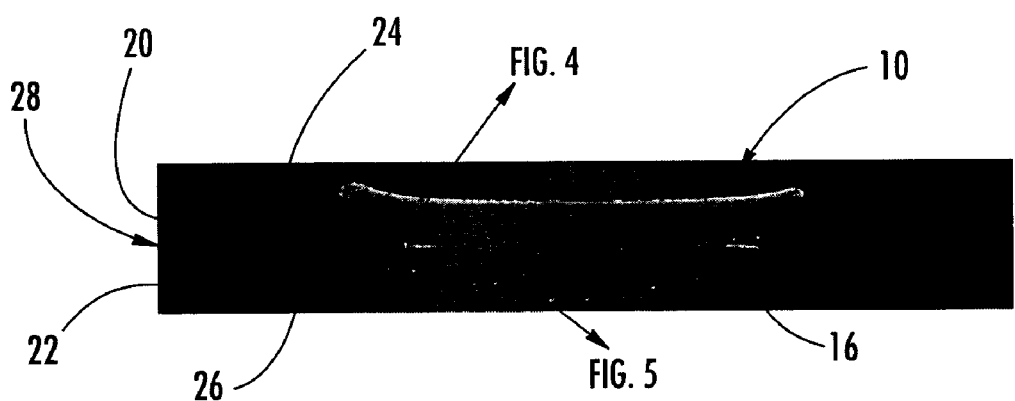
Figure 4:
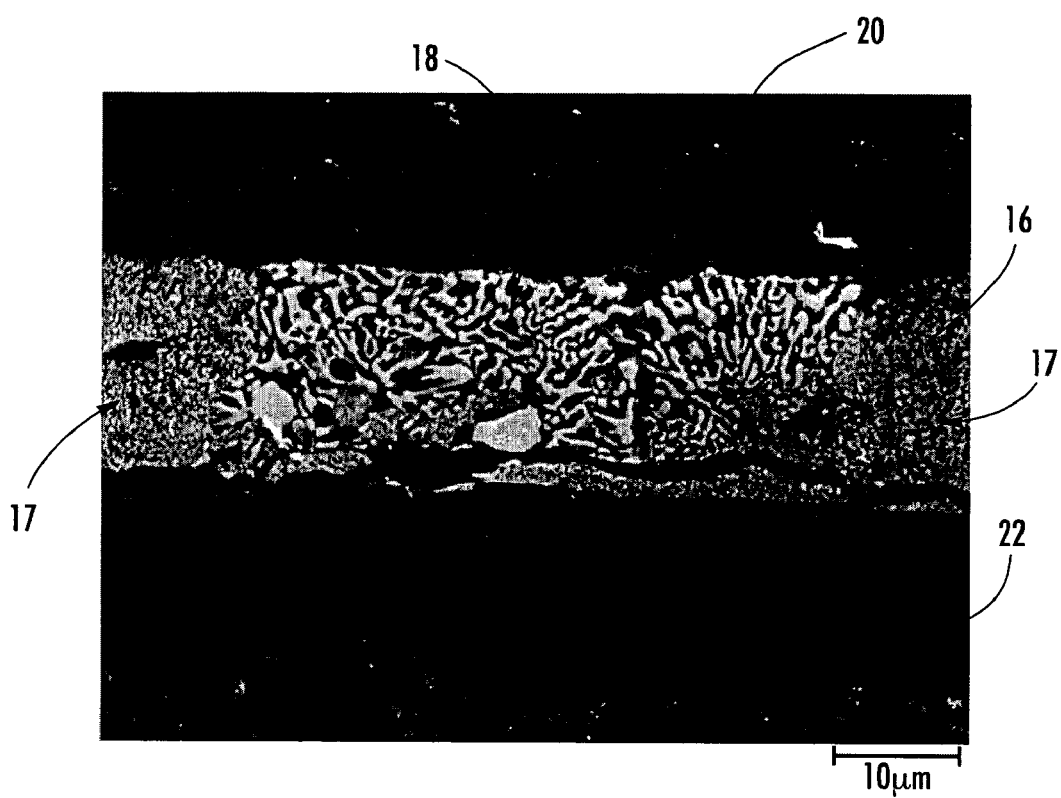
Figure 5:
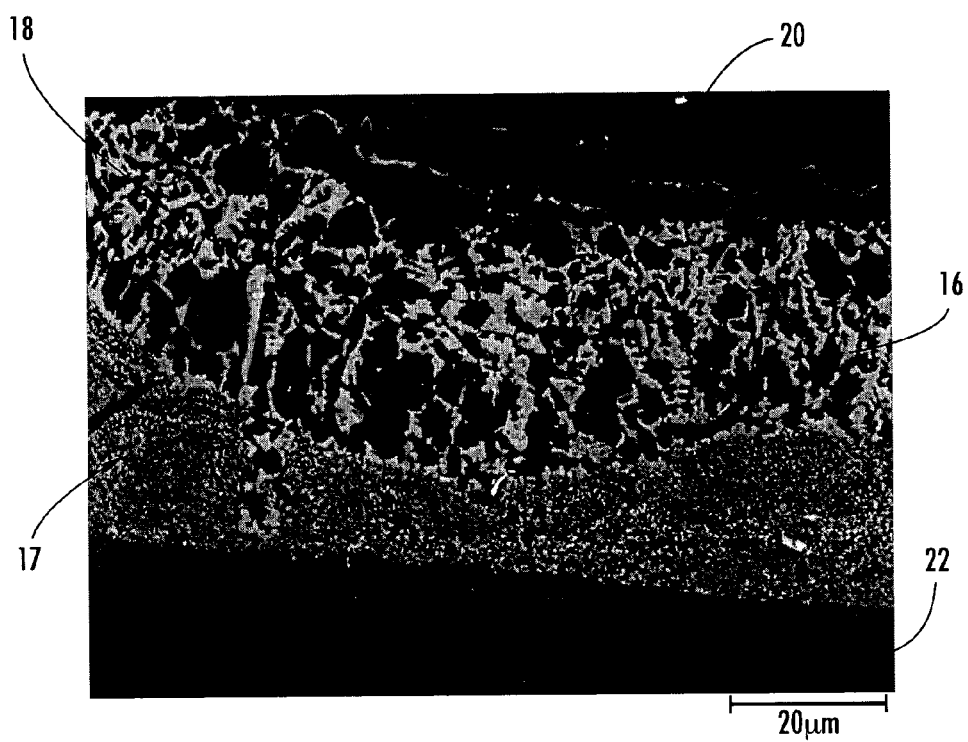

Having thus described the invention in general terms, reference will now be made to the accompanying drawings, which are not necessarily drawn to scale, and wherein:

FIG. 1 is a section view in elevation illustrating a friction stir welding tool configured to weld structural members according to one embodiment of the present invention;

FIG. 2 is a section view in elevation illustrating a weld joint formed by a friction weld joint according to one embodiment of the present invention;

FIG. 3 is a section view in elevation of a weld joint formed according to one embodiment of the present invention;

FIG. 4 is an enlarged section view illustrating a portion of the weld joint of FIG. 3 as indicated by FIG. 3; and FIG. 5 is an enlarged section view illustrating another portion of the weld joint of FIG. 3 as indicated by FIG. 3.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown an apparatus for forming a weld joint 10 to connect first and second structural members 20, 22, as shown in FIG. 2. Two structural members are typically joined by the method of the present invention, but a single structural member can be joined, for example, a tubular member or otherwise curved member with adjoining edges. Alternatively, three or more structural members can be joined. In the illustrated configuration, the first structural member 20 is disposed so that a faying surface 24 of the first structural member 20 overlaps a faying surface 26 of the second structural member 22 so that the two structural members 20, 22 form an interface 28 therebetween. A friction stir welding tool 30, including a rotatable pin 32 extending from a shoulder 34, is inserted through the interface 28 generally perpendicular to the interface 28. An anvil (not shown) or other support can be disposed against the second structural member 22 to oppose the friction stir weld tool 30. The friction stir welding tool 30 is then urged against the first structural member 20 and advanced along the interface 28 of the structural members 20, 22 as the pin 32 rotates. The motion of the pin 32 generates frictional heat, which plasticizes material from the structural members 20, 22, and the plasticized material is mixed by the pin 32. As the plasticized material cools and hardens, a friction stir weld joint 10 is formed connecting the two structural members 20, 22, as shown in FIG. 2. The weld joint 10 is characterized by a nugget region 12 proximate to the path of the pin 32, the nugget region 12 being characterized by a refined granular structure.

The process of friction stir welding for joining structural members 20, 22 is known in the art and is described, for example, in U.S. Pat. No. 5,460,317 to Thomas, et al., the entirety of which is incorporated herein by reference. The weld joint 10 formed by the configuration shown in FIG. 1 is generally referred to as a lap joint, i.e., a joint generally perpendicular to the interface of overlapping members. In other embodiments of the present invention, other weld joints can alternatively be formed by friction stir welding. In addition, other types of friction welding, such as linear friction welding, can also be used to join members, as can welding devices and methods other than friction welding devices and methods. Further, the structural members 20, 22 can also be joined without welding, for example, by solder joints, braze joints, rivets, bolts, clips, other fasteners, crimps, and the like. The present invention is not limited to these or other types of joints, and instead can be used with a wide variety of joints for connecting structural members 20, 22.

The structural members 20, 22 can define any of a variety of shapes such as sheets, plates, blocks, and the like. The members 20, 22 can be formed of metals, such as aluminum, titanium, or alloys thereof. Further, the members 20, 22 can be joined to create an assembly used for various applications including frames, panels, skins, airfoils, and the like for aeronautical and aerospace structures, such as aircraft and spacecraft, marine vehicles, automobiles, and the like. In some applications, the members 20, 22 are joined in geometrical configurations that make difficult or prevent subsequent access for inspecting or treating the joint 10. For example, the structural members 20, 22 can be overlapped and joined to form a partially or fully closed body such as an airplane wing.

Although the faying surfaces 24, 26 of the structural members 20, 22 can correspond closely in contour, the interface 28 is characterized by spaces or voids 14 between the surfaces 24, 26 where the weld joint 10 is not formed, i.e., on either side of the weld joint 10. According to one embodiment of the present invention, a sealant 16 is disposed between the structural members 20, 22 at the interface 28 thereof. The sealant 16 can be disposed on one or both of the faying surfaces 24, 26 of the structural members 20, 22, and can be disposed over part or all of the area of the interface 28, including the nugget region 12. Thus, the sealant 16 can fill the spaces 14 between the faying surfaces 24, 26 of the structural members 20, 22. The sealant 16 prevents chemicals, moisture, debris, and other substances from entering the spaces 14, and the sealant 16 thereby prevents corrosion or other damage that can be caused by those substances.

Preferably, the sealant 16 is characterized by a melting temperature that is less than the melting temperature of the structural members 20, 22 and the highest temperature generated during friction stir welding so that the sealant 16 can be bonded to portions of the faying surfaces 24, 26 of the structural members 20, 22, including portions of the faying surfaces 24, 26 where the structural members 20, 22 are not melted during welding. The term "melting temperature," is meant to refer to a temperature at which the sealant 16 becomes at least partially melted and sufficiently hot for diffusion bonding to the structural members 20, 22. In some embodiments, the sealant 16 is formed of multiple constituent materials, one or more of which can have a melting temperature that is equal to or higher than the melting temperature of the sealant 16 and/or the structural members 20, 22. Further, the melting temperature of the sealant 16 can be lower than the melting temperatures of all of the constituent materials. The melting temperature of the sealant 16 can be less than about 500° C., for example, between about 350° C. and 450° C., which is less than the melting temperature of many aluminum and titanium alloys and lower than the temperatures at which these materials are typically friction stir welded. Thus, the melting temperature can be sufficiently low so that some or all of the sealant 16 is melted during the weld process, for example, by the frictional heat generated during friction stir welding.

According to one embodiment of the present invention, the sealant 16 is a mixture that includes germanium and aluminum. Germanium can be provided in an amount between about 10% and 51.6% by weight of the sealant 16. Some or all of the remaining content of the sealant 16 can be aluminum. For example, the sealant 16 can include 51.6 weight % germanium and a balance of aluminum, a mixture characterized by a melting temperature of about 420° C., which is generally the lowest melting temperature for a mixture that includes only germanium and aluminum, sometimes referred to as the eutectic temperature. The sealant 16 can also include one or more additional materials such as silicon, silver, and strontium. For example, the sealant 16 can include 30.2 weight % germanium, 36.8 weight % silver, and a balance of aluminum, a mixture characterized by a melting temperature of about 418° C., the eutectic temperature for a mixture that includes only germanium, silver, and aluminum. Alternatively, the sealant 16 can comprise germanium, aluminum, and silicon, which can be characterized by a melting temperature of between about 420° C. and 500° C. For example, the sealant 16 can include 60.5 weight % aluminum, 35 weight % germanium, and 4.5 weight % silver, an alloy characterized by a melting temperature of about 500° C. Further, the sealant 16 can include other constituents that enhance the material properties or reduce the cost of the sealant. For example, strontium, which can modify and refine the germanium, thereby increasing the ductility of the sealant 16, can be included in an amount less than about 0.5% by weight, such as between about 0.001% and 0.03% by weight.

The sealant 16 can also be electrochemically neutral or cathodic relative to the material of the structural members 20, 22 so that the sealant 16 is less susceptible to corrosion. For example, the aluminum-germanium mixtures described above are generally electrochemically neutral or cathodic to most aluminum and titanium alloys. According to one embodiment, if the sealant 16 is used with structural members 20, 22 formed largely of aluminum, the sealant 16 can contain little or no zinc, lithium, manganese, or magnesium, which are more anodic than aluminum.

The sealant 16 can be formed by any of various methods that are known in the art for forming powdered mixtures. For example, the sealant 16 can be formed by melting and mixing the constituent materials. The molten mixture can be cast and allowed to cool to form a solid ingot, which can then be ground into a fine powder. The sealant 16 is then disposed on one or both of the faying surfaces 24, 26 of the structural members 20, 22 by spreading the sealant 16 by hand or spraying a coating of the sealant 16, for example, by plasma spraying, flame spraying, high velocity oxy-fuel spraying, and the like. The particles of the sealant 16 can be heated and melted during the deposition process, while the structural members 20, 22 remain unmelted. Alternatively, the particles can remain unmelted during deposition. The amount of sealant 16 disposed on the faying surfaces 24, 26 can vary, but in one embodiment of the invention, a layer of between about 0.001 and 0.003 inches is disposed. The sealant 16 can be disposed over all or part of the faying surfaces 24, 26, including the portion of the interface 28 that is welded to form the nugget area 12 of the joint 10, although in some cases the sealant 16 may positively or negatively affect certain mechanical properties of the joint 10.

The sealant 16 is then heated to a temperature sufficient to thermally bond the sealant 16 to the faying surfaces 24, 26 of the structural members 20, 22, e.g., the melting temperature of the sealant 16. The thermal energy for heating the sealant 16 can be generated entirely by the welding process. For example, if the structural members 20, 22 are friction stir welded, the frictional heat resulting from the motion of the pin 32 and the shoulder 34 can heat the structural members 20, 22 and the sealant 16, thereby melting the sealant 16 so that the sealant 16 flows fluidly, adheres to the faying surfaces 24, 26, and is diffusion bonded thereto. While the sealant 16 close to the path of the pin 32 can be heated primarily by the pin 32, the sealant 16 that is further from the pin 32 may be heated to a greater extent by frictional heat generated between the shoulder 34 and the first structural member 20 as the shoulder 34 rotates against the structural member 20. Advantageously, the diameter of the shoulder 34 can be increased so that the shoulder 34 generates frictional heat over a greater area of the structural member 20. For example, according to one embodiment of the present invention, the diameter of the shoulder 34 is about equal to the width of the interface 28 so that the shoulder 34 generates frictional heat over the width of the interface 28.

Other welding or other connection methods can also sufficiently heat the sealant 16 to create the bond between the sealant 16 and the faying surfaces 24, 26. In addition, a heat source (not shown) other than the device used for connection can be provided. For example, a radiant heater, such as an electric or gas oven or other heater can be used to heat the sealant 16. Alternatively, the heat source can be a laser that is used to direct light onto the sealant 16 to heat the sealant 16. The laser can be configured to direct the light on the structural members 20, 22 or in a direction generally parallel to a plane of the interface 28 and toward the edges of the interface 28 to heat the sealant 16 at the perimeter of the interface 28.

In some embodiments of the present invention, some of all of the sealant 16 is not heated to the melting temperature and, therefore, does not melt during the friction welding process. However, when subjected to sufficient heat and pressure during welding, the sealant 16 can be diffusion bonded at a temperature less than the melting temperature of the sealant 16. Thus, the sealant 16 can bond to the faying surfaces 24, 26 of the structural members 20, 22 and seal the interface 28 therebetween.

FIGS. 3–6 illustrate a weld joint 10 in which the spaces 14 defined by the interface 28 of the structural members 20, 22 have been sealed with the sealant 16. The weld joint 10 shown in FIGS. 3–6 are representative of one embodiment of the present invention, and it is understood that the structure, type, and configuration of the structural members 20, 22, sealant, and joint 10 as illustrated are representative only and numerous other weld joints 10 can alternatively be formed according to the present invention. As shown, the structural members 20, 22 are sheets of 7075-T6, an alloy formed primarily of aluminum, zinc, magnesium, copper, and chromium. The sealant 16, formed of 51.6 weight % germanium and a balance of aluminum, was manually spread on the faying surface 26 of the structural member 22 in solid particulate form. The structural members 20, 22 were then configured as illustrated to form the interface 28 therebetween and held in place while joined. Friction stir welding was performed using a friction stir welding device similar to the tool 30 illustrated in FIG. 1, by urging the shoulder 34 of the tool 30 against the first structural member 20 so that the pin 32 extended generally perpendicular to the interface 28 and therethrough and moving the rotating pin 32 linearly along the interface 28. Frictional heat from the welding process melted some of the sealant 16.

FIGS. 4 and 5 are enlarged views of the weld joint 10 at two particular locations as indicated in FIG. 3. As shown in FIGS. 4–5, the sealant 16, which appears lighter in color than the material of the structural members 20, 22, is diffusion bonded to both of the structural members 20, 22. In particular, granular eutectic portions 17 are formed where the sealant 16 has been at least partially melted and bonded to the structural members 20, 22. Sintered portions 18 are formed where the sealant 16 has not been melted but has been subjected to sufficient heat and pressure to form a metallurgical bond with the material of the structural members 20, 22. Each joint 10 formed according to the present invention can include granular eutectic portions 17 and/or sintered portions 18.

Many modifications and other embodiments of the invention set forth herein will come to mind to one skilled in the art to which this invention pertains having the benefit of the teachings presented in the foregoing descriptions and the associated drawings. For example, while FIGS. 3–5 illustrate joints 10 formed by applying the sealant 16 to one of the faying surfaces 26, the sealant 16 can be applied to either or both of the faying surfaces 24, 26 in other embodiments of the present invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A weld joint comprising:
   at least one structural member defining first and second faying surfaces in an opposed configuration and defining an interface therebetween;
   a weld joint extending through the interface and connecting the first and second faying surfaces of the at least one structural member; and
   a sealant disposed in the interface and being diffusion bonded to the faying surfaces, the sealant comprising aluminum and germanium and being characterized by a melting temperature that is lower than the melting temperature of the at least one structural member.

2. A weld joint according to claim 1 wherein the at least structural member comprises first and second substantially parallel members defining the faying surfaces respectively, and the weld joint extends substantially perpendicular through the interface of the faying surfaces.

3. A weld joint according to claim 1 wherein the weld joint comprises a nugget area formed by friction stir welding and characterized by a refined granular structure.

4. A weld joint according to claim 1 wherein the sealant comprises at least one of the group consisting of strontium, silver, and silicon.

5. A weld joint according to claim 1 wherein the sealant is cathodic relative to the at least one structural member.

6. A weld joint according to claim 1 wherein the sealant is characterized by a melting temperature less than about 500° C.

7. A weld joint according to claim 1 wherein the sealant is characterized by a melting temperature of about 420° C.

8. A weld joint according to claim 1 wherein the sealant comprises between about 10% and 51.6% germanium by weight.

9. A weld joint according to claim 1 wherein the sealant comprises about 51.6% germanium and about 48.4% aluminum by weight.

10. A weld joint according to claim 1 wherein the sealant comprises about 30.2% germanium, about 36.8% silver, and about 33% aluminum by weight.

11. A weld joint according to claim 1 wherein the sealant substantially fills the interface.

12. A sealant for sealing an interface between faying surfaces of at least one structural member that is friction welded, the sealant comprising:
    a composition of aluminum and germanium being cathodic relative to the at least one structural member and being characterized by a melting temperature that is lower than the melting temperature of the at least one structural member such that the sealant can be melted and bonded to the faying surfaces as the at least one structural member is friction welded,
    wherein the sealant comprises about 30.2% germanium, about 36.8% silver, and about 33% aluminum by weight.

13. A sealant according to claim 12 wherein the sealant is characterized by a melting temperature less than about 500° C.

14. A sealant according to claim 12 wherein the sealant is characterized by a melting temperature of about 420° C.

15. A sealant according to claim 12 wherein the sealant comprises between about 10% and 51.6% germanium by weight.

16. A sealant according to claim 12 wherein the sealant further comprises at least one of the group consisting of strontium, silver, and silicon.

17. A sealant according to claim 12 wherein the sealant comprises about 51.6% germanium and about 48.4% aluminum by weight.

18. A method of sealing a weld joint, the method comprising:
    disposing a sealant on at least one of first and second faying surfaces of at least one structural member, the sealant comprising aluminum and germanium and being characterized by a melting temperature that is lower than the melting temperature of the at least one structural member;
    positioning the faying surfaces in an opposing configuration to form an interface therebetween; and
    welding the at least one structural member to form a weld joint extending through the interface and thereby heating the sealant such that the sealant bonds with the at least one structural member proximate to the weld joint.

19. A method according to claim 18 wherein said welding step comprises heating the sealant to at least a melting temperature of the sealant.

20. A method according to claim 18 wherein said welding step comprises heating at least some of the sealant to a temperature no greater than a melting temperature of the sealant and thereby diffusion bonding the sealant to the at least one structural member.

21. A method according to claim 18 further comprising providing the at least one structural member comprising aluminum.

22. A method according to claim 18 further comprising providing the sealant comprising about 51.6% germanium and about 48.4% aluminum by weight.

23. A method according to claim 18 further comprising providing the sealant comprising about 30.2% germanium, about 36.8% silver, and about 33% aluminum by weight.

24. A method according to claim 18 further comprising providing the sealant comprising at least one of the group consisting of strontium, silver, and silicon.

25. A method according to claim 18 further comprising providing the sealant being cathodic relative to the at least one structural member.

26. A method according to claim 18 wherein said disposing step comprises plasma spraying the sealant onto the faying surfaces.

27. A method according to claim 18 wherein said disposing step comprises disposing the sealant in a thickness of between about 0.001 and 0.003 inches.

28. A method according to claim 18 wherein said disposing step comprises disposing the sealant on both of the first and second faying surfaces.

29. A method according to claim 18 wherein said welding step comprises rotating a friction stir welding pin extending from a shoulder and urging the pin through the interface to thereby friction stir weld the at least one structural member.

30. A method according to claim 29 wherein said positioning step comprises overlapping the faying surfaces to form the interface having a width about equal to the width of the shoulder.

31. A weld joint according to claim 1 wherein each structural member is formed of metal such that the first and second faying surfaces are metal.

* * * * *